UNITED STATES PATENT OFFICE.

JEAN WICKERSHEIMER, OF BERLIN, PRUSSIA, GERMANY.

IMPROVEMENT IN COMPOUNDS FOR PRESERVING ORGANIC BODIES.

Specification forming part of Letters Patent No. 220,103, dated September 30, 1879; application filed May 3, 1879.

*To all whom it may concern:*

Be it known that I, JEAN WICKERSHEIMER, of the city of Berlin, in the Kingdom of Prussia, and German Empire, have invented a new and useful Compound, the composition of which and the manner to use it are fully described and set forth in the following specification.

The invention relates to that class of compounds used to preserve dead human and animal bodies and vegetables; and its object is not only to protect these objects against putrefaction for a very long time, but to preserve their natural form and flexibility as well as their colors in perfection.

To prepare my compound, dissolve first, by weight, one hundred parts of alum, twenty-five parts of common salt, twelve parts of niter, sixty parts of potash, and ten parts of arsenious acid in three thousand parts of boiling water, and let the solution cool down and settle. Afterward filter it. The result is a clear, colorless, and odorless fluid, which must react neither acid nor alkaline, but neutral. Then take, by measure, four parts of glycerine and one part of methyl-alcohol, and mix with them ten parts of the fluid aforesaid.

This mixture is my compound for preserving dead human and animal bodies and vegetables.

To preserve anatomical preparations, as skeletons with natural ligaments, cancers, beetles, and similar objects, which shall be kept afterward in a dry state, they are put in the compound for about six to twelve days, according to their size and volume; then removed from the compound and air-dried; after which treatment they are ready to be placed in the museum. They remain flexible for years, may be forever, and can be made at any time to produce all the natural movements of the living object.

Hollow objects—to wit, lungs, bowels, or similar parts—are filled with the compound and put in the same for six to twelve days; after which time they are taken out of the compound, emptied, and air-dried.

It may be remarked here that it is advantageous to inflate such hollow preparations, especially bowels, previous to their air-drying.

Lizards, snakes, and similar objects, also vegetables, are preserved by keeping them submerged in the compound, as the main object commonly is the preservation of their color. Otherwise they are air-dried after six to twelve days impregnation with the compound.

To preserve dead human or animal bodies, be it for scientific purposes or for embalming the former, the compound is forced by a syringe into an artery, in which is made, for that purpose, an incision to receive the mouth of the syringe.

The quantity of compound to be applied varies from about one and one-half quart to five quarts and more, according to the volume of the body to be treated.

The injection should be made as soon after death as possible, as it indeed excludes and stops putrefaction, but cannot restore already-destroyed organic formations.

Bodies treated with my compound will show for years the flesh, the muscles, the tissues, even the soft parts, perfectly, in the same state as they were in when injected.

In case of embalming it is advisable to rub the whole corpse on the outside with the compound after the injection is made, or after the impregnation, if such is preferred, and to inclose it in an air-tight vessel or coffin. Not only the form of the dead will then be preserved, but the epidermis will also retain its natural color.

I know very well that single ingredients of my compound have been tried for similar purposes; but all these previous attempts have, so far as I am aware, failed to produce the preservation of the bodies, combined with the flexibility and color of their parts.

I claim as my invention—

1. A compound for preserving, consisting of glycerine, methyl-alcohol, and a solution of mineral antiseptics, in which alum is the chief ingredient, substantially as described.

2. A preservative compound, consisting of glycerine, methyl-alcohol, and a solution of alum, salt, niter, potash, and arsenious acid, substantially as and in the proportions specified.

This specification signed by me this the 5th day of April, 1879.

JEAN WICKERSHEIMER.

Witnesses:
CARL T. BURRHARDT,
BERTHOLD ROI.